United States Patent Office 2,891,975
Patented June 23, 1959

2,891,975

2,5-PREGNADIENE DERIVATIVES

Percy L. Julian, Oak Park, and Helen C. Printy, Chicago, Ill., assignors to The Julian Laboratories, Inc., Franklin Park, Ill., a corporation of Illinois No Drawing. Application August 22, 1958
Serial No. 756,539

10 Claims. (Cl. 260—397.4)

This invention relates to a new series of corticoid steroids. This invention more specifically is concerned with pregnane compounds characterized by possessing a 2,5-dien-4-one system in the A–B rings.

The compounds of this invention have substantial cortisone-like activity. Particularly important is their anti-inflammatory activity. In addition, these agents unexpectedly have been found to have central nervous system depressant activity which tends to induce a mild sedative action, which is particularly useful in animals. Certain of these compounds find use as intermediates, such as the 11-methylene and 17-hydrogen compounds of Formula I, below, which can be converted into medicinally active cortisone or hydrocortisone analogues by methods known to the art.

The 2,5-pregnadiene derivatives of this invention are represented by the following structural formula:

Formula I

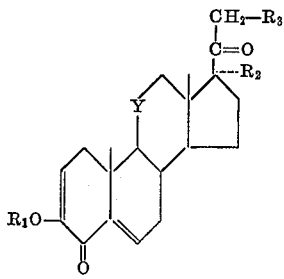

when:

$R_1$ represents an acyl moiety derived from a non-toxic, stable and pharmaceutically-acceptable carboxylic acid, preferably with less than 8 carbon atoms, such as for example a lower alkanoyl of from 1 to 7 carbon atoms, benzoyl or hexahydrobenzoyl;

$R_2$ represents a hydrogen or preferably a hydroxyl;

$R_3$ represents a hydrogen or preferably a hydroxyl or an acylated derivative thereof, such as defined for $R_1$, such as an $R_1O$ moiety;

Y represents a methylene (—$CH_2$—), a carbonyl

or a hydroxymethylene

preferably β.

Preferred compounds are represented by Formula I when $R_1$ is acetyl, $R_2$ is hydroxyl, $R_3$ is hydroxy or acetoxy and Y is carbonyl or β-hydroxymethylene.

The acyl group, $R_1$, substituted at either the 3 or 21 position may, in practice, represent any acyl moiety derived from a nontoxic, stable and pharmaceutically-acceptable carboxylic acid. Such acylated derivatives must have physiological activity by themselves or by yielding the active parent hydroxyl compound in vivo.

Illustrative of such acyl compounds are those derived from stearic, palmitic, oleic, benzoic, cyclopentylpropionic, furoic, phenylacetic, phenoxyacetic, succinic, 3,3-dimethylpentanoic, etc., acids.

The compounds of this invention are prepared by reacting a compound which has the normal 3-keto-$\Delta^4$ unsaturated system, such as cortisone, hydrocortisone or progesterone, with two molar equivalents of bromine, preferably with a catalytic amount of hydrogen bromide, to form the 2,6-dibrominated analogue which is then reacted with an excess of an alkali metal salt of a lower aliphatic acid in a low boiling solvent in which the reactants are at least partially soluble.

Formula II

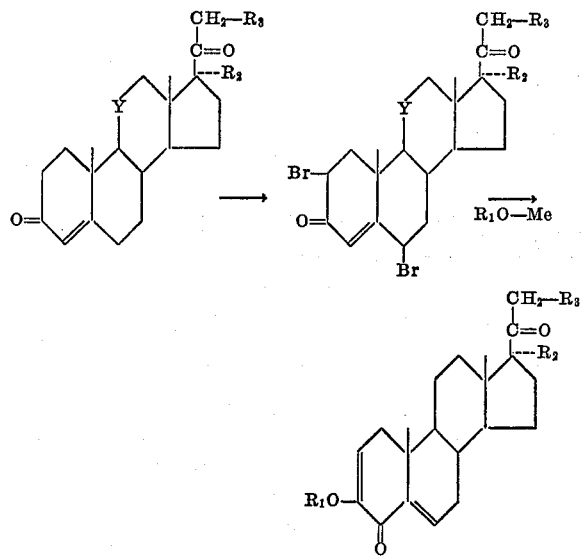

Most conveniently, the reaction of the dibromo derivatives with the alkali metal salt is carried out using an excess of the salt reactant, such as about 1 to 15 times by weight of the dibromo derivative. Practically, as little as two molar equivalents of salt can be used but, advantageously, a large excess of the salt is used. The salt is preferably an alkali metal salt whose anion corresponds to the definition of $R_1$ hereabove. The alkali metal salts most preferred are the sodium or potassium salts of lower aliphatic acids of from 1 to 7 carbon atoms. In practice a wide range of acid salts may be used, for instance, those with benzoate, hexahydrobenzoate or palmitate anions or those with lithium, calcium or magnesium cations.

The solvent for the reaction may be chosen from low boiling alcohols, ketone, chlorinated hydrocarbons or mixtures thereof. Exemplary of the solvents used are those boiling below about 120° C., such as methyl ethyl ketone, methanol, propanol, isobutanol, isopropanol, butanol, methylene chloride or mixtures thereof. Preferred are anhydrous ethanol, acetone and methyl ethyl ketone.

The reaction is advantageously run at the boiling point of the solvent employed. The temperature is not, however, allowed to go above the thermal decomposition point of the dibromo starting material. The reaction may be run in low yield at room temperature, i.e., about 25° C. Advantageously, the reaction is run as a slurry with stirring at the boiling point of the solvent, i.e., less than about 120° C. The time for substantially complete rearrangement varies with reaction conditions but is usually complete at elevated temperatures in from about 1 to about 48 hours.

The end products are conveniently isolated by concentration, washing with water and extracting the residue with a water-immiscible organic solvent, such as ether or methylene chloride. The organic extracts are dried and concentrated to give the desired pregnadiene.

As one skilled in the art will note, the 2,6-brominated starting material often has a reactive position at the 21-position adjacent to the 20-keto group, i.e., $R_3$ is hydrogen. If the pure 2,6-dibromo compound is desired as starting material, the 20-keto group may be replaced by a hydroxyl group prior to the bromination, then oxidized after bromination, such as with standard chromic acid reagent by methods known to the art. Advantageously, however, the compound where $R_3$ is hydrogen is brominated with three molar equivalents of bromine at positions 2, 6 and 21. The salt rearrangement in the presence of an excess of alkali metal salt is then run as described above to introduce the acyloxy moiety at position 21, as well as form the 2,5-pregnadiene.

The rearrangement can be run on the 21-acyl compound or optionally on the 21-hydroxyl compound which thereafter may be acylated by methods known to the art.

The following examples will serve to illustrate preparation of the novel compounds as well as variations of the processes of this invention. The scope of this invention is not to be limited by these examples since it will be obvious to one skilled in the art that these examples are merely illustrative of this invention and that modifications thereof are possible.

*Example 1*

A solution of 3.2 g. of bromine in 25 ml. of methylene chloride with a drop of 15% hydrogen bromide-glacial acetic acid is added to a solution of 4.02 g. of cortisone acetate in 100 ml. of methylene chloride over a five-minute period. The light colored solution is then extracted with 200 ml. of water, containing 3.0 g. of sodium acetate. The organic layer is dried and evaporated. The crude yellow residue of 2,6-dibromocortisone acetate is dissolved in 100 ml. of acetone and heated at reflux with 20.0 g. of fused sodium acetate with stirring for 15 hours.

The reaction mixture is concentrated, washed with water and taken into methylene chloride. After washing with water and drying, the solution is concentrated and cooled to separate 3,17α,21 - trihydroxy - 2,5 - pregnadien-4,11,20-trione 3,21-diacetate; M.P. 252–254° C.

*Example 2*

A purified sample of 2,6-dibromocortisone (2.0 g., prepared as in Example 1) with 10.0 g. of sodium formate in 100 ml. of anhydrous ethanol is heated at reflux for ten hours. The solvent is removed in vacuo. The residue is washed with water then taken into methylene chloride. Concentration of the dried extract gives 3-formyloxy-17α,21-dihydroxy-2,5-pregnadien-4,11,20-trione.

This compound (100 mg.) is dissolved in 5 ml. of pyridine with 0.2 ml. of benzoyl chloride. The solution after several hours, is poured into water to separate 21-benzoyloxy - 3 - formyloxy - 17α - hydroxy - 2,5 - pregnadien-4,11,20-trione.

*Example 3*

A solution of 4.04 g. of hydrocortisone acetate in 100 ml. of methylene chloride is brominated as in Example 1. The crude 2,6-dibromo compound is reacted with fused potassium acetate in acetone for 15 hours at reflux. After working up as in Example 1, 3,11,17α,21-tetrahydroxy - 2,5 - pregnadien - 4,20 - dione 3,21 - diacetate is obtained.

*Example 4*

A solution of 3.44 g. of 17α-hydroxy-11-keto-progesterone in 150 ml. of methylene dichloride is brominated with 3 molar equivalents (4.8 g.) of bromine in 50 ml. of methylene chloride with a trace of hydrogen bromide over a period of 15 minutes at room temperature. The solution is washed with 250 ml. of water containing 5.0 g. of sodium acetate. The organic layer is dried and evaporated to leave an orange syrup, the tribromide. This syrup, in 100 ml. of acetone, is heated at reflux with 25.0 of fused potassium acetate for 30 hours. The reaction mixture is concentrated and exhaustively washed with water. The residue is recrystallized from methylene chloride to give 3,17α,21-trihydroxy-2,5-pregnadien-4,11,20-trione 3,21-diacetate, M.P. 252–255° C.

*Example 5*

A solution of 3.4 g. of desoxycorticosterone acetate in 200 ml. of methylene dichloride is reacted with a solution of 3.2 g. of bromine in 50 ml. of methylene dichloride with a trace of hydrogen bromide. After working up as in Example 4, the crude dibromide is reacted with 20.0 g. of sodium heptanoate in 200 ml. of methyl ethyl ketone for 20 hours. The reaction mixture is concentrated. The residue is washed several times with water then extracted into methylene dichloride. Concentration and cooling gives the 3-heptanoyloxy-21-hydroxy-2,5-pregnadien-4,20-dione.

This ester (200 mg.) is dissolved in pyridine and reacted with 1 ml. of heptanoic anhydride. Quenching in water separates 3,21-diheptanoyloxy-2,5-pregnadien-4,20-dione.

This reaction is carried out as described above but using 2.0 g. of desoxycorticosterone dibromide and 15.0 g. of potassium acetate to give the 3-acetate derivative.

*Example 6*

A suspension of 2.0 g. of the 2,6-dibromo derivative of hydrocortisone hexahydrobenzoate and 15.0 g. of sodium benzoate in 150 ml. of acetone is heated at reflux for 25 hours with stirring. Working up as in Example 1, results in the recovery of the 3-benzoyl-21-hexahydrobenzoyl diester of 3,11,17α,21-tetrahydroxy-2,5-pregnadien-4,20-dione.

*Example 7*

A solution of 2.0 g. of 2,6-dibromocortisone in 150 ml. of dried ethanol is reacted with sodium acetate (15.0 g.) at reflux for 25 hours. After working up as described in Example 1, 3-acetoxy-17α,21-dihydroxy-2,5-pregnadien-4,11,20-trione is obtained.

*Example 8*

A solution of 3.1 g. of 20-hydroxy-4-pregnen-3-one is brominated with 3.2 g. of bromine as in Example 1. The resulting 2,6-dibromo compound is reacted with 15.0 g. of sodium acetate in 200 ml. of acetone. After working up as in Example 1, 3-acetoxy-20-hydroxy-2,5-pregnadien-4-one is obtained. One gram of this material is oxidized in 20 ml. of pyridine with 0.75 g. of chromic oxide. After standing overnight, the solution is quenched in 200 ml. of water. The filtered solution is extracted with methylene chloride. The extracts are washed with water, alkali, dried and evaporated. The pyridine is removed by steam distillation. The residue is taken into methylene chloride. Concentration and trituration with ether gives 3-acetoxy-2,5-pregnadien-4,20-dione.

What is claimed is:

1. A chemical compound having the following formula:

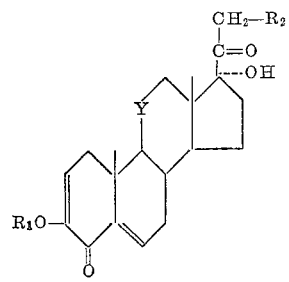

in which $R_1$ is acyl derived from a nontoxic, stable and pharmaceutically acceptable acid of less than 8 carbon atoms; Y is a member selected from the group consisting of carbonyl and hydroxymethylene; and $R_2$ is a member selected from the group consisting of hydroxyl and acyloxy, said acyl moiety being derived from a nontoxic, stable and pharmaceutically acceptable acid of less than 8 carbon atoms.

2. 3,21-diacetoxy-17α-hydroxy-2,5-pregnadien-4,11,20-trione.

3. 3,21-diacetoxy-11,17α-dihydroxy-2,5-pregnadien-4,20-dione.

4. 3-acetoxy-2,5-pregnadien-4,20-dione.

5. 3-acetoxy-21-hydroxy-2,5-pregnadien-4,20-dione.

6. 3-acetoxy-17α,21-dihydroxy-2,5-pregnadien-4,11,20-trione.

7. A chemical compound having the following formula:

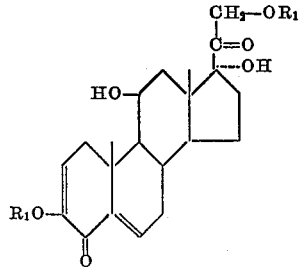

in which $R_1$ is an acyl derived from a nontoxic, stable, pharmaceutically acceptable carboxylic acid of less than 8 carbon atoms.

8. The method of forming compounds having the following formula:

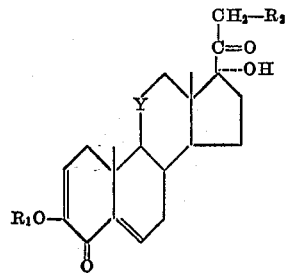

in which $R_1$ is acyl derived from a nontoxic, stable and pharmaceutically acceptable acid of less than 8 carbon atoms; $R_2$ is a member selected from the group consisting of hydroxyl and acyloxy, said acyl moiety being derived from a nontoxic, stable and pharmaceutically acceptable acid of less than 8 carbon atoms; and Y is a member selected from the group consisting of carbonyl and hydroxymethylene, which comprises reacting with an excess of an alkali metal salt of a carboxylic acid at from about 25° C. to about 120° C. in a solvent of boiling point less than about 120° C. in which the reactants have substantial solubility a compound having the following formula:

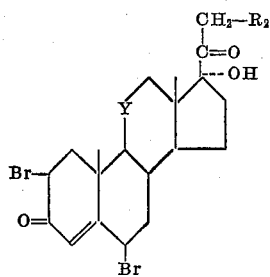

in which $R_2$ is a member selected from the group consisting of hydroxyl, bromine and acyloxy, said acyl moiety being derived from a nontoxic, stable and pharmaceutically acceptable acid of less than 8 carbon atoms.

9. The method of claim 8 characterized in that the reaction is run at the boiling point of the solvent.

10. The method of claim 8 characterized in that the carboxylic acid is a lower aliphatic acid of 1 to 7 carbons.

No references cited.